No. 646,728. Patented Apr. 3, 1900.
W. L. CROUCH.
AUTOMOBILE STEERING GEAR.
(Application filed July 14, 1899.)
(No Model.)
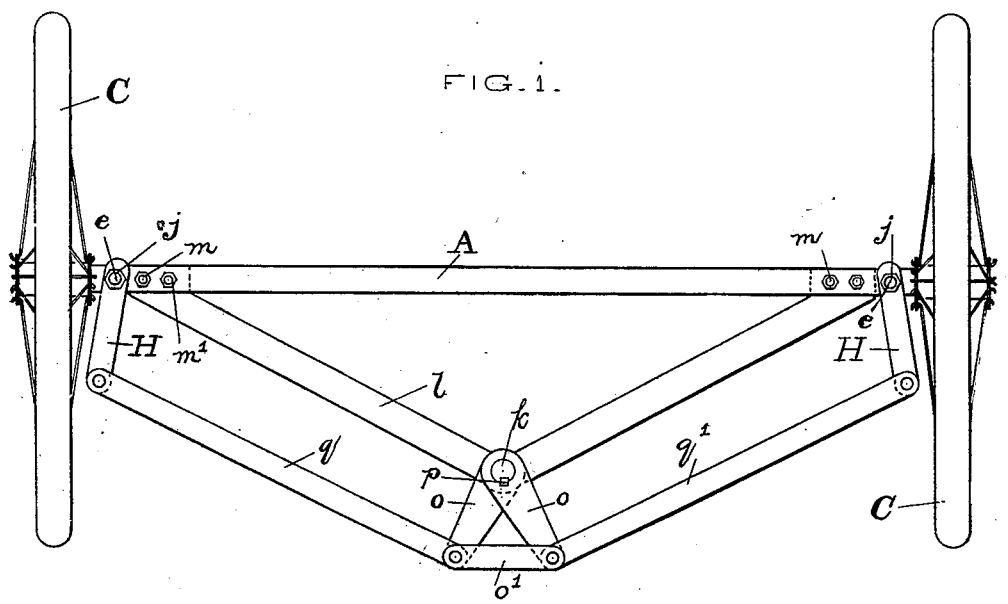
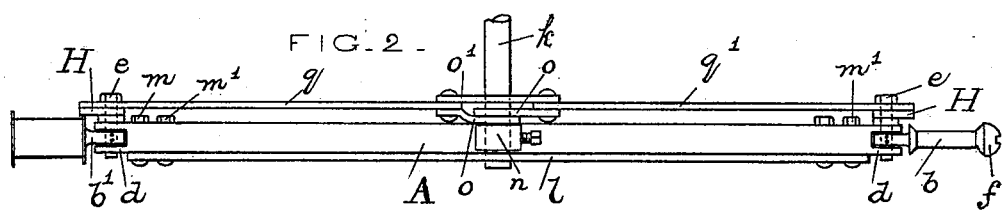
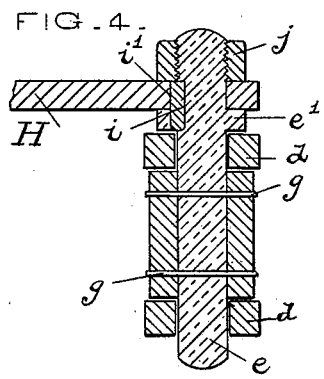
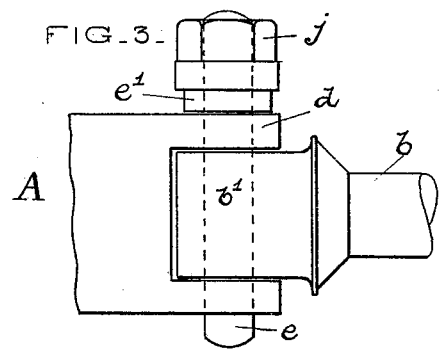
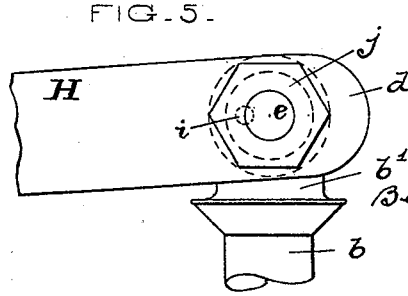
WITNESSES
Wm H. Vail
Charles B. Mann Jr.
INVENTOR
Walker Lee Crouch
By Chas. B. Mann
ATTORNEY
THE NORRIS PETERS CO., PHOTO-LITHO., WASHINGTON, D. C.

UNITED STATES PATENT OFFICE.

WALKER LEE CROUCH, OF NEW BRIGHTON, PENNSYLVANIA, ASSIGNOR, BY MESNE ASSIGNMENTS, TO THE COLUMBIA MOTOR AND MANUFACTURING COMPANY, OF WASHINGTON, DISTRICT OF COLUMBIA.

AUTOMOBILE STEERING-GEAR.

SPECIFICATION forming part of Letters Patent No. 646,728, dated April 3, 1900.

Application filed July 14, 1899. Serial No. 723,771. (No model.)

*To all whom it may concern:*

Be it known that I, WALKER LEE CROUCH, a citizen of the United States, residing at New Brighton, in the county of Beaver and State of Pennsylvania, have invented certain new and useful Improvements in Automobile Steering-Gear, of which the following is a specification.

This invention relates to improved steering-gear for automobile-vehicles.

The invention will first be described, and then set forth in the claim.

In the drawings, Figure 1 is a top plan view of the front axle, wheels, and steering-gear connections. Fig. 2 is a rear elevation of the axle and steering-gear connections and shows at one end of the axle the wheel-spindle and at the other end the hub of the wheel on the spindle. Fig. 3 is a detail view, on a large scale, showing the pivot connection of the spindle to the axle. Fig. 4 is a vertical section of the parts shown in Fig. 3. Fig. 5 is a top view of the parts shown in Fig. 3.

The letter A designates the front axle of a vehicle, having each end bifurcated to receive a pivoted axle-arm $b$, on which the wheel C turns. The end of the axle has two projecting lugs or ears $d$, one above the other, and between them is the pivoted end $b'$ of the axle-arm. A pivot-bolt $e$ extends down through the two ears $d$ and also through the end $b'$ of the axle arm or spindle, whereby the latter may swing on the pivot in a horizontal plane. The wheels C are secured on the spindles by a nut $f$ or other suitable means. The axle arm or spindle $b$ is made rigid with respect to the pivot-bolt $e$ by pins $g$, which extend through both the end $b'$ of the spindle and the pivot-bolt. A lever H is rigidly attached to the pivot-bolt, so that by swinging the lever the spindle and wheel may be turned. The manner of attaching the lever H to the pivot-bolt is shown in Fig. 4. The upper end of the pivot-bolt has a collar-flange $e'$, which sits on top of the upper ear $d$, and a key-pin $i$ fits in a socket or recess at one side of the said bolt at and just above the collar-flange. The lever H has a hole that takes over the upper end of the pivot-bolt, and at one side of said hole is a notch $i'$, that takes around the key-pin. This key-pin therefore keeps the lever H from turning loose on the pivot-bolt. A nut $j$ on the bolt confines the lever to its position. It will now be seen that when the lever H is swung one way or the other the spindle-arm $b$ and wheel C will turn.

An upright guide-post $k$ is at the center between the two levers H and is supported on a bar $l$, lying in a horizontal plane and curved or bent backward from the front axle A and having its two ends secured to the axle by bolts $m\ m'$ near each of the two pivot-bolts $e$. The bar $l$, which between its ends is curved backward, acts as a truss to the axle and gives to the latter increased stability. A collar $n$ is on the guide-post and rests upon the said bar $l$ and serves to step the guide-post.

Two arms $o$ and a link $o'$ constitute a triangular-shaped frame or plate which is secured by a key $p$, fast to the guide-post, and a rod $q$ is jointed at one angle of this frame and connects with the lever H at one side, and another rod $q'$ in like manner connects from the other angle to the lever H at the other side. It will now be seen that any partial turn given the guide-post $k$ will result in turning the two axle arms or spindles $b$ and the two front wheels C as may be desired. If one spindle is turned backward, the other spindle will be turned correspondingly forward. The front axle A itself always remains stationary in contradistinction to pivoting on a king-bolt and is always parallel with the rear axle.

The upper end of the guide-post $k$, though not shown in the drawings, will have a suitable handle-bar.

Having thus described my invention, what I claim as new, and desire to secure by Letters Patent of the United States, is—

The combination of a front axle which always remains parallel with the back axle and having each end bifurcated; an axle arm or spindle secured in each bifurcated end by pivot-bolts, $e$, said bolts made rigid with respect to the axle arms or spindles by pins, $g$, and each bolt having a collar-flange, $e'$, which rests on the upper member of each bifurcation; two levers which rest on said collarflanges and are keyed fast to each pivot-bolt; a truss-bar, $l$, lying in a horizontal plane and having its two ends rigidly secured to the axle and between the ends curved or bent backward; a guide-post stepped in the said truss-bar; and connections from the said guide-post to each of said levers, as set forth.

In testimony whereof I affix my signature in the presence of two witnesses.

WALKER LEE CROUCH.

Witnesses:
    THOS. C. BAILEY,
    CHARLES B. MANN, Jr.